United States Patent
Philipp et al.

(10) Patent No.: US 11,383,421 B2
(45) Date of Patent: Jul. 12, 2022

(54) METHOD FOR LEAKAGE DETECTION IN A DEVICE FOR SHAPING CONTAINER PREFORMS

(71) Applicant: KRONES AG, Neutraubling (DE)

(72) Inventors: Thomas Philipp, Eilsbrunn (DE); Robert Aust, Illkofen (DE); Thomas Kitzinger, Regensburg (DE); Dieter Finger, Neutraubling (DE); Thomas Rauschendorfer, Irlbach (DE)

(73) Assignee: KRONES AG, Neutraubling (DE)

( * ) Notice: Subject to any disclaimer, the term of this patent is extended or adjusted under 35 U.S.C. 154(b) by 66 days.

(21) Appl. No.: 16/644,153

(22) PCT Filed: Jul. 27, 2018

(86) PCT No.: PCT/EP2018/070409
§ 371 (c)(1),
(2) Date: Mar. 3, 2020

(87) PCT Pub. No.: WO2019/042675
PCT Pub. Date: Mar. 7, 2019

(65) Prior Publication Data
US 2021/0107206 A1    Apr. 15, 2021

(30) Foreign Application Priority Data
Sep. 4, 2017   (DE) .................... 10 2017 215 461.6

(51) Int. Cl.
*B29C 49/80* (2006.01)
*B29C 49/46* (2006.01)

(52) U.S. Cl.
CPC .............. *B29C 49/80* (2013.01); *B29C 49/46* (2013.01); *B29C 2049/4697* (2013.01)

(58) Field of Classification Search
CPC ......... B29C 49/80; B29C 49/46; B29C 49/36; B29C 49/10; B29C 2049/4697
See application file for complete search history.

(56) References Cited

U.S. PATENT DOCUMENTS

| | | | |
|---|---|---|---|
| 3,072,959 A | 1/1963 | Leeds et al. | |
| 8,658,080 B2 | 2/2014 | Brunner et al. | |
| 2008/0184781 A1* | 8/2008 | Mulligan | G01M 3/022 73/40.5 R |

FOREIGN PATENT DOCUMENTS

| | | |
|---|---|---|
| DE | 10247167 A1 | 4/2004 |
| DE | 102014009991 A1 | 1/2016 |
| DE | 202015106917 U1 | 4/2016 |

OTHER PUBLICATIONS

ISA European Patent Office, International Search Report Issued in Application No. PCT/EP2018/070409, dated Oct. 30, 2018, WIPO, 4 pages.

* cited by examiner

*Primary Examiner* — Monica A Huson
(74) *Attorney, Agent, or Firm* — McCoy Russell LLP

(57) ABSTRACT

ABSTRACT The invention provides a method for leakage detection in a device for shaping container preforms, comprising a compressed air system which is connected to a compressed air source and comprises at least two fluidically connected regions that can be separated from each other and/or from the environment by shut-off elements. The method comprises a leakage test run conducted in an automated manner in which at least one of the blocking elements and/or the compressed air supply into the compressed air system is controlled in such a way that it can be determined separately for each region whether compressed air escapes therefrom.

18 Claims, 5 Drawing Sheets

METHOD FOR LEAKAGE DETECTION IN A DEVICE FOR SHAPING CONTAINER PREFORMS

CROSS-REFERENCE TO RELATED APPLICATIONS

The present application is a U.S. National Phase of International Patent Application Serial No. PCT/EP2018/070409 entitled "METHOD FOR LEAKAGE DETECTION IN A DEVICE FOR SHAPING CONTAINER PREFORMS," filed on Jul. 27, 2018. International Patent Application Serial No. PCT/EP2018/070409 claims priority to German Patent Application No. 10 2017 215 461.6 filed on Sep. 4, 2017. The entire contents of each of the above-referenced applications are hereby incorporated by reference for all purposes.

TECHNICAL FIELD

The application relates to a method for leakage detection in a device for shaping container preforms.

BACKGROUND AND SUMMARY

For the production of containers, for example bottles, devices are used, primarily for plastic containers, which shape a container by pressurizing it with compressed air, so that the material takes the shape of the container. The preforms are, for example, heated and blown into a mold. The preforms, for example, can there still be stretched with a stretching rod, like in a stretch blow-molding machine.

When shaping with compressed air, there are typically several treatment stations present (also referred to as blow-molding stations), where one preform each is shaped at each treatment station. The compressed air is usually supplied from a compressed air source, for example a compressor, via a compressed air distributor, for example a rotary distributor. The seals of the compressed air distributor are highly stressed components, as they have to withstand the compressed air delivered under high pressure. The seals therefore become leaky over time due to wear, a leakage arises. A leakage can also occur in other regions, such as at valves or connectors.

Currently, the leakage is typically only detected when air escaping due to the leakage causes a hissing sound. In this case, however, the pressure loss may already be so severe that production must be interrupted as soon as possible for maintenance. The loss of production can lead to high costs.

Before the leakage is detected, the shaping of the containers, for example, the stretch blow-molding process, can still operate as long as the compressed air source can still supply a sufficient amount of compressed air. During this period, the shaping process continues, but the energy consumption of the compressed air source, for example, the air compressor, significantly increases.

As a result, the overall efficiency of the system is impaired and production costs are high.

It is therefore the object of the invention to provide a method for leakage detection in a device for shaping container preforms which enables reducing an increase in production costs and loss of efficiency due to leakage.

The object is satisfied in that the invention provides a method for leakage detection in a device for shaping container preforms comprising a compressed air system which is connected to a compressed air source and comprises at least two fluidically connected regions that can be separated from each other and/or from the environment by shut-off elements, where the method comprises a leakage test run that is conducted, in particular, in an automated manner in which at least one of the shut-off elements and/or the compressed air supply to the compressed air system is controlled in such a manner that it can be determined separately for each region whether compressed air escapes therefrom.

Based on the leakage test run, it is possible to systematically search for a possible leakage in the system. Such a leakage test run can be conducted, in particular, at scheduled points in time outside production hours within the framework of scheduled production interruptions for testing and maintaining the device. During such an interruption, other components can also be tested in addition to the leakage test, for example, the stretching rod tips in the case of a stretch blow-molding machine.

As a result, additional and unscheduled production interruptions do not occur. In addition, the leakage can be detected early during regular scheduled inspections before it becomes acoustically apparent with the hissing sound, especially if the leakage has not yet developed very far. Leaky valves can then be replaced and/or other leaks can be rectified. This saves costs that would otherwise be incurred due to increased energy consumption by the compressed air source. Overall, costs are therefore reduced and the efficiency is increased.

By determining individually/separately for the regions whether compressed air escapes, it is possible to detect where the leakage occurs in the system and a selective rectification of the problem is possible. In particular, it can possibly be detected whether the leakage occurs due to certain leaky valves or other leaks in the system. For example, it can be determined for a blow-molding machine with a rotary distributor, dome pressure control valves, ring channels and/or blowing block valves of the blow-molding stations whether and which valves are affected and/or whether the rotary distributor leads to a leakage and/or whether the compressed air system is leaking elsewhere.

For example, the compressed air source can be an air compressor. The shut-off elements can comprise, for example, valves, in particular dome pressure control valves and/or blowing block valves at blow-molding stations and/or a compressed air distributor, for example, a rotary distributor.

Examples of the regions are, for example, a region between the compressed air distributor and the dome pressure control valves, between the dome pressure control valves and the blowing block valves, in particular ring channels, a low pressure region or a region between the pressure source or shut-off elements of the pressure source, respectively, and the dome pressure control valves, i.e. a region in which the compressed air distributor is arranged.

The fact that two regions are fluidically connected is presently not to exclude that other regions or shut-off elements are arranged between the two regions, as long as a connection is basically present. "Separated" is to mean that regions are separated fluidically, in particular that a fluid connection between the regions is blocked.

A leakage test run is a sequence of test steps in which it is determined for at least two of the regions separately whether compressed air escapes therefrom. The test run is conducted in an automated manner. This means that, once the test run has started, the selection and sequence of the test steps of the test run can be executed without the intervention of a user. In particular, all steps can be performed (possibly after a user starts the test run) without user intervention.

However, the fact that the test run is conducted in an automated manner does not preclude a user from starting or stopping the test run or confirming between the test steps on a control panel that the next step is to be executed.

Controlling the shut-off elements can comprise, in particular, opening or closing the shut-off elements. Controlling the compressed air supply to the compressed air system can comprise controlling the operation of the compressed air source and/or adjusting valves, such as shut-off valves and/or control valves, between the compressed air source and the compressed air system.

Determining whether compressed air escapes from a region to be tested can be done on the basis of the development of the air pressure over time in that region and/or in a region adjoining that region.

Measuring the development of the air pressure over time in only one region, while appropriately switching and applying compressed air, can possibly allow conclusions to be drawn regarding two regions, namely the region itself and a region directly adjoining. This is advantageous because the number of pressure sensors can be kept low and because regions into which pressure sensors cannot be introduced or only with difficulty can nevertheless be tested for leakage.

The test run can comprise that the region to be tested is pressurized with compressed air and separated from the other regions and the environment and that, while the region to be tested is separated, the development of the air pressure in that region or in a region adjoining that region is determined over time. Determining the development of the air pressure over time can done on the basis of measurements of one or more pressure sensors arranged in the region to be tested and/or an adjoining region. The pressure sensors can be, for example, analog pressure sensors.

It can be determined in particular that compressed air escapes from the region to be tested when the air pressure in this region decreases, for example, in a given measuring period drops below a predetermined limit value and/or drops at a rate greater than a predetermined limit value, and/or if the ratio of the pressure loss and a predetermined pressure value, for example, a target pressure value, or a measured pressure value, for example, the pressure value at the beginning of the measurement, is greater than a predetermined limit value. It can alternatively or additionally be determined in particular that compressed air escapes from the region to be tested into an adjoining region when the air pressure in the adjoining region increases (without any other effects acting upon this adjoining region), for example, above a predetermined limit value (in particular during a given measurement period) and/or increases at a rate greater than a predetermined limit value, and/or if the ratio of the pressure increase and a predetermined pressure value, for example, a target pressure value, or a measured pressure value, for example, the pressure value at the beginning of the measurement, is greater than a predetermined limit value. If compressed air escapes from the region to be tested into the adjoining region, this means that the shut-off element between the region to be tested and the adjoining region is leaking.

If the above-described limit values are complied with, then it shall hereafter be said that the air pressure is within a predetermined tolerance range.

In particular, a region can be pressurized with compressed air and separated from the other regions and the environment and the development of the air pressure in that region and in a region adjoining that region can be determined over time.

If the respective development over time shows that compressed air escapes from the region to be tested and compressed air flows into an adjoining region (without any other effects acting upon this adjoining region), then this means that the shut-off element between the region to be tested and the adjoining region is leaking.

If the respective development over time shows that compressed air escapes from the region to be tested but no compressed air flows into an adjoining region (without any other effects acting upon this adjoining region), then this means that the shut-off element between the region to be tested and the adjoining region is tight and the compressed air escapes elsewhere. The compressed air therefore escapes elsewhere, for example, into other adjoining regions and/or the environment. If this has been established, then the test run can comprise testing shut-off elements to the other adjoining regions, for example, by determining the development of the air pressure in the other adjoining regions over time.

The development of the air pressure over time in the region to be tested can be compared with the development of the air pressure over time in an adjoining region and it can be determined on the basis of the comparison whether a pressure drop in the region to be tested is caused solely by the compressed air escaping into the adjoining region, solely by the compressed air escaping into the environment and/or other adjoining regions or in part by compressed air escaping into the adjoining region and into other adjoining regions and/or into the environment.

This allows for a very precise diagnosis of where the leakage occurs.

It is to be noted that several regions, in particular all, can be tested in a leakage test run, but that not all regions necessarily need to be tested.

Test data of the test run, in particular the measured values for the air pressure in different regions, the development over time determined therefrom and, possibly, conclusions drawn therefrom that and/or where a leakage is present, can be stored. Then a user can find out by subsequent evaluation in what state the compressed air system is, and perform a diagnosis. Alternatively or additionally, at least part of the test data can be output to a user interface during the test run, so that the user can intervene in the test run, for example, interrupt or abort it. In particular, in the event that it is determined that compressed air escapes from a region, a message can be output in an automated manner indicating to an operator of the device the need for action.

The test runs can be conducted regularly in the form of test cycles. For example, a test run can always be conducted following a predetermined number of operating hours, for example, after 1500 operating hours. Alternatively or additionally, a test run can be conducted, in particular repeatedly, during standby phases of the device. Such long-term monitoring makes it possible to diagnose which parts are affected by wear by observing changes in leakage values.

The test run can comprise that it is determined in an automated manner, for example by way of a control device, on the basis of test data of a test step of the test run which test step is to be executed next. For this purpose, for example, decision rules that are applied to the test data can be stored. The decision rules can also comprise one or more abortion criteria and, where the test data of a test step meet one of the abortion criteria, then the test run can be aborted automatically.

For example, a test run can be interrupted if compressed air escapes from a region and it is not possible during the test run to determine where the compressed air escapes. In such a case, the continuation of the test run can be meaningless if the further test steps depend on the fact that it is known where the compressed air escapes.

The leakage detection test run can comprise a test for the tightness of the dome pressure control valves and/or a test for the tightness of blowing block valves of treatment stations, such as blow-molding stations, and/or a test of a compressed air distributor and/or a test of a low pressure region. In particular, a test of the dome pressure control valves can be conducted first and subsequently a test of the blowing block valves.

The test for the tightness of the dome pressure control valves can comprise that the dome pressure control valves are closed and then the region adjoining the dome pressure control valves is vented and closed again, in particular the region with the ring channels up to the treatment stations. The air pressure is subsequently measured in the region directly adjoining the dome pressure control valves, for example in the ring channels, in particular the development of the air pressure over time.

If the air pressure remains constant in the region directly adjoining the dome pressure control valves or at least within a predetermined tolerance range, then the dome pressure control valve is considered to be tight. If the air pressure increases in the region directly adjoining the dome pressure control valves (to a value outside the tolerance range), then the dome pressure control valve is considered to be leaking. It can namely be concluded from the pressure increase that compressed air escapes through the dome pressure control valve into this region, so that the air pressure there increases.

The test for the tightness of the blowing block valves in the blow-molding stations, which can be conducted in particular after the test for the tightness of the dome pressure control valves, comprises that the blowing block valves are closed and the region immediately upstream of the blowing block valves, for example, the ring channels, are pressurized with compressed air, which can be done, for example, by opening the dome pressure control valves. This region is then closed again, for example, the dome pressure control valves are closed. Then the air pressure in this region is measured, in particular the development of the air pressure over time. If the air pressure in this region remains constant or at least within a predetermined tolerance range, then the blowing block valves are considered to be tight. If the air pressure drops (to a value outside the tolerance range) (provided that the dome pressure control valves are tight), then the blowing block valves are leaking. It can namely be concluded from the pressure drop that compressed air escapes through the blowing block valves of the treatment station.

It is unlikely that both the dome pressure control valves and the blowing block valves of the blow-molding stations are leaking during the same test run. However, should this be the case and should the leakage of the dome pressure control valves be detected in a first step, then this known leakage can be taken into account in the test for the tightness of the blowing block valves.

In such a case, it is also conceivable that a warning is issued to a user so that the user can decide to replace the dome pressure control valves prior to continuing the test run.

Alternatively or additionally, the region between the compressed air source and the dome pressure control valves can be tested, where this region is completely separated for this purpose, in particular all dome pressure control valves are closed, and is pressurized with compressed air and the connection to the compressed air source is subsequently shut off. A leakage can be detected by measuring the air pressure in this region, for example, if it drops to a value outside a tolerance range. In particular, this test step executed after testing the dome pressure control valves, as they can then ideally already be excluded as a point of leakage.

Overall, all test methods are an approximation, because a leakage can also be present in other components. Compressed air, for example, could also escape to incorrectly mounted or defective hoses and connectors. However, the compressed air distributor and the valves are so heavily stressed components that the probability of leakage occurring there is significantly higher. Therefore, the approximation is sufficiently accurate.

The invention also provides a device for shaping container preforms comprising a compressed air source and a compressed air system which is connected to the compressed air source and comprises at least two fluidically connected regions that can be separated from each other and/or from the environment by shut-off elements. The device comprises a control device which is configured, in particular, for conducting a leakage test run in an automated manner by controlling at least one of the shut-off elements and/or the compressed air supply to the compressed air system in such a way that it can be determined separately for each region whether compressed air escapes therefrom.

Controlling the shut-off elements can comprise opening or closing the shut-off elements. Controlling the compressed air supply to the compressed air system can comprise controlling the operation of the compressed air source and/or adjusting valves, such as shut-off valves and/or control valves, between the compressed air source and the compressed air system.

The device in at least one of the regions can comprise a pressure sensor which is configured to record the air pressure in this region. In particular, the device can also comprise pressure sensors in several, in particular, all regions. As noted above, also measuring the development of the air pressure over time in only one region can possibly allow conclusions to be drawn about two regions, namely the region itself and a region directly adjoining. This is advantageous because the number of pressure sensors can be kept low and because regions into which pressure sensors cannot be introduced or only with difficulty can nevertheless be tested for leakage.

The device can comprise a data connection between the at least one pressure sensor and the control device, where the device is in particular configured such that the control device receives measured values from the pressure sensors via the data connection.

The control device can be configured in particular such that it controls the shut-off elements and/or the compressed air supply according to the steps described above in the context of the method, and in particular processes the test data according to the method described above.

In the following paragraph, it is described by way of example how a device for shaping container preforms can be configured.

The device for shaping plastic preforms into plastic containers can be, for example, a blow-molding machine. This means that the plastic preforms are first thermally conditioned in a heating section and then expanded by being acted upon with a liquid or gaseous medium. The flowable medium is preferably pressurized. For the supply of the pressurized medium, the device comprises a blow nozzle which can bear against a neck finish of the plastic preforms in a sealing manner in order to thus expand the plastic preforms with a liquid or gaseous medium. In addition, a valve arrangement is preferably provided which controls the supply of the blowing air to the plastic preforms.

The blow-molding machine can in particular be a stretch blow-molding machine, which means that the preforms are stretched in the longitudinal direction by use of a stretching rod prior to and/or during the expansion. The blow-molding stations each comprise stretching rods which can be inserted into the plastic preforms and stretch the plastic preforms in their longitudinal direction. The stretching rods preferably comprise an electric drive.

In an advantageous embodiment, a plurality of blow-molding stations is arranged on a joint movable carrier. This carrier is in particular a rotatable carrier. The blow-molding stations each have a blow-molding device which preferably forms a cavity, within which the plastic preforms can be stretched to become the plastic containers. These blow-molding devices are preferably formed as multiple parts and comprise two blow mold halves and a base mold. These blow mold halves are preferably detachably arranged on a mold carrier shell or on the blow mold carriers. The blow mold carriers are pivotable relative to each other to open and close the blow-molding devices. In addition, the blow mold carrier comprises locking mechanisms to lock the mold halves against each other during the blowing-molding process.

Particularly preferably, the blow-molding machine is or the carrier and the blow mold arrangements are arranged within a clean room which defines the blow-molding machine relative to an unsterile environment. Drive devices for closing, locking and/or opening the blow molds are preferably arranged outside the clean room.

The blow-molding devices are preferably transported within the cleanroom. The cleanroom is preferably defined by several walls. The cleanroom is preferably defined by at least one stationary wall and a wall that moves relative to this stationary wall. The cleanroom separates the blow molds in particular from a non-sterile environment. The cleanroom is advantageous formed to be ring- or torus-shaped around the blow-molding stations or forming stations and/or the transport path of the plastic containers.

It is understood that the various features, in particular the features relating to the test run, can also be combined with differently configured devices for shaping container preforms.

The invention also relates to the use of one of the devices described above for carrying out one of the methods described above.

It is understood that the features and benefits described in the context of the method are also valid for and applicable to the device.

BRIEF DESCRIPTION OF THE FIGURES

Further features and advantages of the invention shall be described below on the basis of the figures, where.

DETAILED DESCRIPTION

Figure 1:
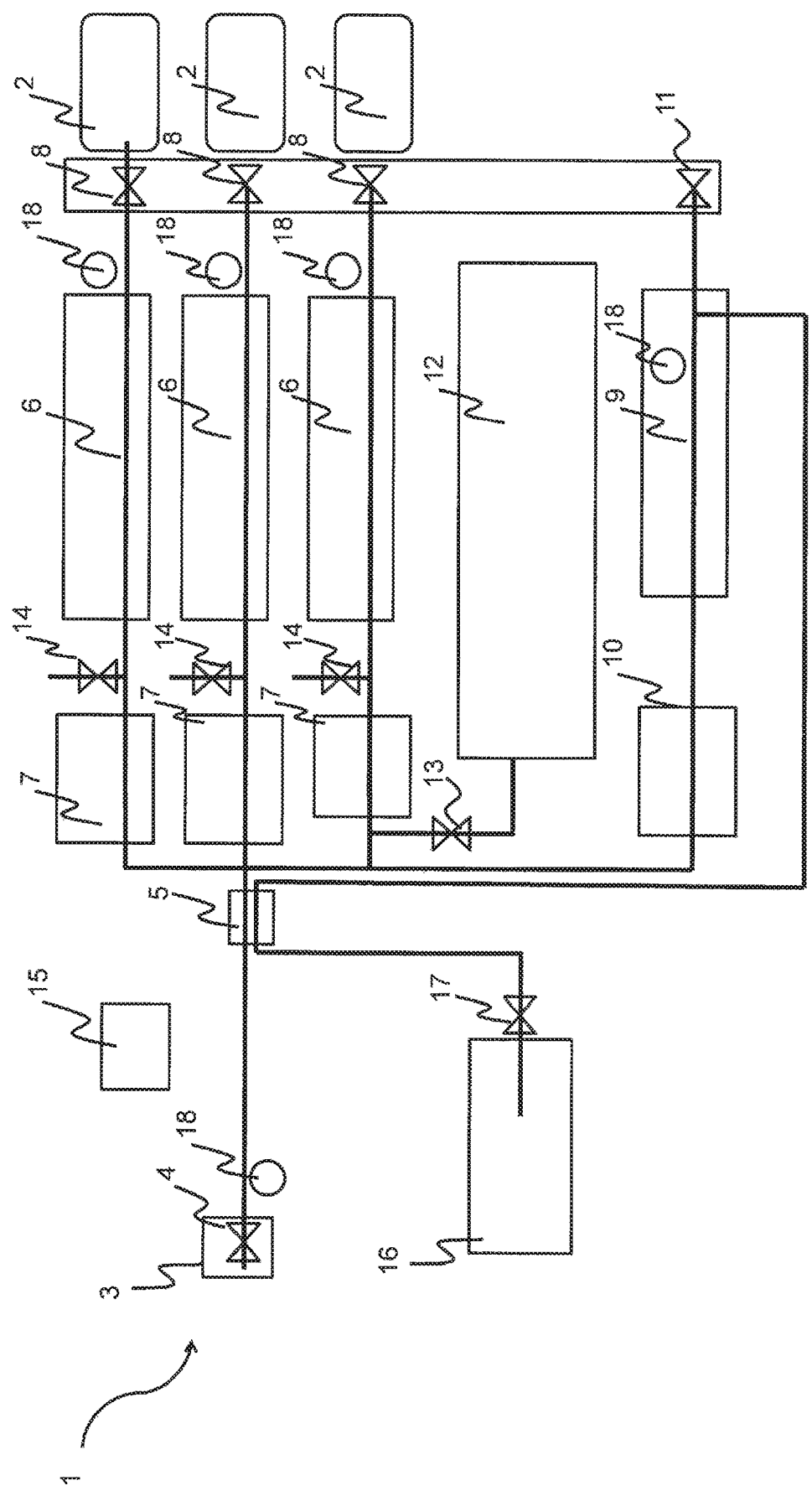
FIG. 1 shows a schematic diagram of a device for shaping container preforms.

FIG. 1 shows a schematic diagram of a device 1 for shaping container preforms, for example, in the form of a stretch blow-molding machine, with several treatment stations 2, presently in particular blow-molding stations. At the treatment stations, compressed air is blown into a heated preform during normal operation, whereby one preform is transformed into a container at each station.

The device comprises a compressed air system connected to a compressed air source 3, presently in the form of an air compressor. The compressed air supply from the compressed air source into the compressed air system can be shut off by way of a valve 4 of the compressed air source.

The compressed air system presently comprises a rotary distributor 5 as a compressed air distributor, ring channels 6 which are arranged between dome pressure control valves 7 and blowing block valves 8, a ring channel 9 which is arranged between a dome pressure control valve 10 and blowing block valves 11, a low pressure region 12 and a low pressure region valve 13. As many blowing block valves as the device has treatment stations can there be associated with a ring channel. Each of the ring channels can comprise a vent valve 14. Furthermore, a control device 15 is shown. An external consumer 16 can also optionally be connected to the compressed air system via a consumer valve 17. The three ring channels 6 can be provided in the stretch blow-molding process, for example, for supplying the pre-blowing air, the intermediate blowing air, or the final blowing air.

Ring channel 9 can be used as a buffer storage for the recyclable compressed air. The storage is supplied with the recycled air from the blow-molding stations as well as from the high-pressure system. The high-pressure system can control the storage such that the external supply is always guaranteed. In other words, a continuous supply of the external consumer is guaranteed, even in standby mode, if there is no recycled air.

The low pressure region can be intended for control air for the valves as well as for actuating various pneumatic cylinders. It is possible to perform air recycling in that, by opening consumer valve 17, ring channel 9 is connected to consumer 16. The number and type of channels and valves and the type of compressed air distributor are purely by way of example and can also be selected differently.

As can presently be seen, the compressed air system comprises several fluidically connected regions that can be separated from each other by way of shut-off elements, presently, for example, valves 7, 10 or 13, and that can be separated by way of shut-off elements, presently, for example, valves 8, 11 or 14, from the environment.

The valves presently shown can be actuated in an automated manner by drives, not shown, and the drives can be connected to the control device via a data connection (not illustrated) and can be controlled by the control device in such a way that the valves are opened or closed. Optionally, the compressed air source can also be connected via a data connection to the control device and can be controlled by the latter, can in particular be switched on, be switched off and optionally be adjustable in performance. Alternatively or additionally, valve 4 of the compressed air source can be connected to the control device and controllable by the latter.

The control device is configured for conducting a leakage test run in an automated manner by controlling at least one of the valves and/or the compressed air source in such a way that it can be determined separately for different regions of the compressed air system whether compressed air escapes therefrom. For example, the control device can execute a control program and send corresponding control signals to the valves and/or the compressed air source.

Furthermore, pressure sensors 18 which can be formed, for example, in the form of analog pressure sensors are presently shown. The pressure sensors are connected by way of data connections to a computing device, which can in particular be part of the control device, and send measured values to this computing device during operation.

It can be determined using the measured values during the test run or after the test run whether and where a leak is present. If this is determined during the test run, the selection and sequence of the test steps can depend on this determination.

A user terminal, presently not shown, can optionally be provided on which information about the ongoing test run is displayed, for example, an indication of a leak, and/or the user can perform input, for example, input with which a test run is started, interrupted, altered or terminated.

An exemplary method for leakage detection in a device for shaping container preforms shall now be explained on the basis of FIGS. 2a, 2b, 2c, and 2d, where the test run comprises several test steps. For a better understanding, only the pressure sensors that are currently being actively used are entered into the respective figures. The method is presently carried out with a device as shown in FIG. 1. However, this or a comparable method can also be carried out on other, comparable devices comprising a compressed air system connected to a compressed air source comprising at least two fluidically connected regions which can be separated from each other and/or from the environment by way of shut-off elements.

In the method presently described, a leakage test run is conducted in an automated manner, for example, controlled by the control device described above. Various shut-off elements, for example the valves described above, and the compressed air supply into the compressed air system, for example, the compressed air source described above, are there controlled in such a way that it can be determined separately for each region whether compressed air escapes therefrom.

In the test run presently described, first, dome pressure control valves 7, then blowing block valves 8, and then the region between the compressed air source and the dome pressure control valves and the low pressure region valve, which is the first circuit of the rotary distributor are tested. Subsequently, the region, also referred to as the second circuit of the rotary distributor, between dome pressure control valve 10 and blowing block valve 11 (i.e. in the region of ring channel 9) and between ring channel 9 and the consumer valve are tested. It is presently to be noted that not every one of these test steps needs to be executed during a test run and that other test steps or a different sequence of the test steps are also possible.

The test for the tightness of the dome pressure control valves comprises that the dome pressure control valves are closed and then the region adjoining to dome pressure control valves 7 is vented and closed again, in particular the region with ring channels 6 extending from the dome pressure control valves up to blowing block valves 8. Provided the dome pressure control valves close, the ring channels are therefore subsequently substantially at constant ambient pressure. This is indicated schematically in FIG. 2a in that a dashed line is drawn in in this region. The action of compressed air is there indicated by arrows. When the region of the ring channels is separated, the air pressure is measured there, in particular the development of the air pressure over time.

If the air pressure remains constant or within a certain tolerance range, then the dome pressure control valve is considered to be tight. However, if the air pressure rises to a value outside the tolerance range, the dome pressure control valve is considered to be leaking.

Figure 2A:
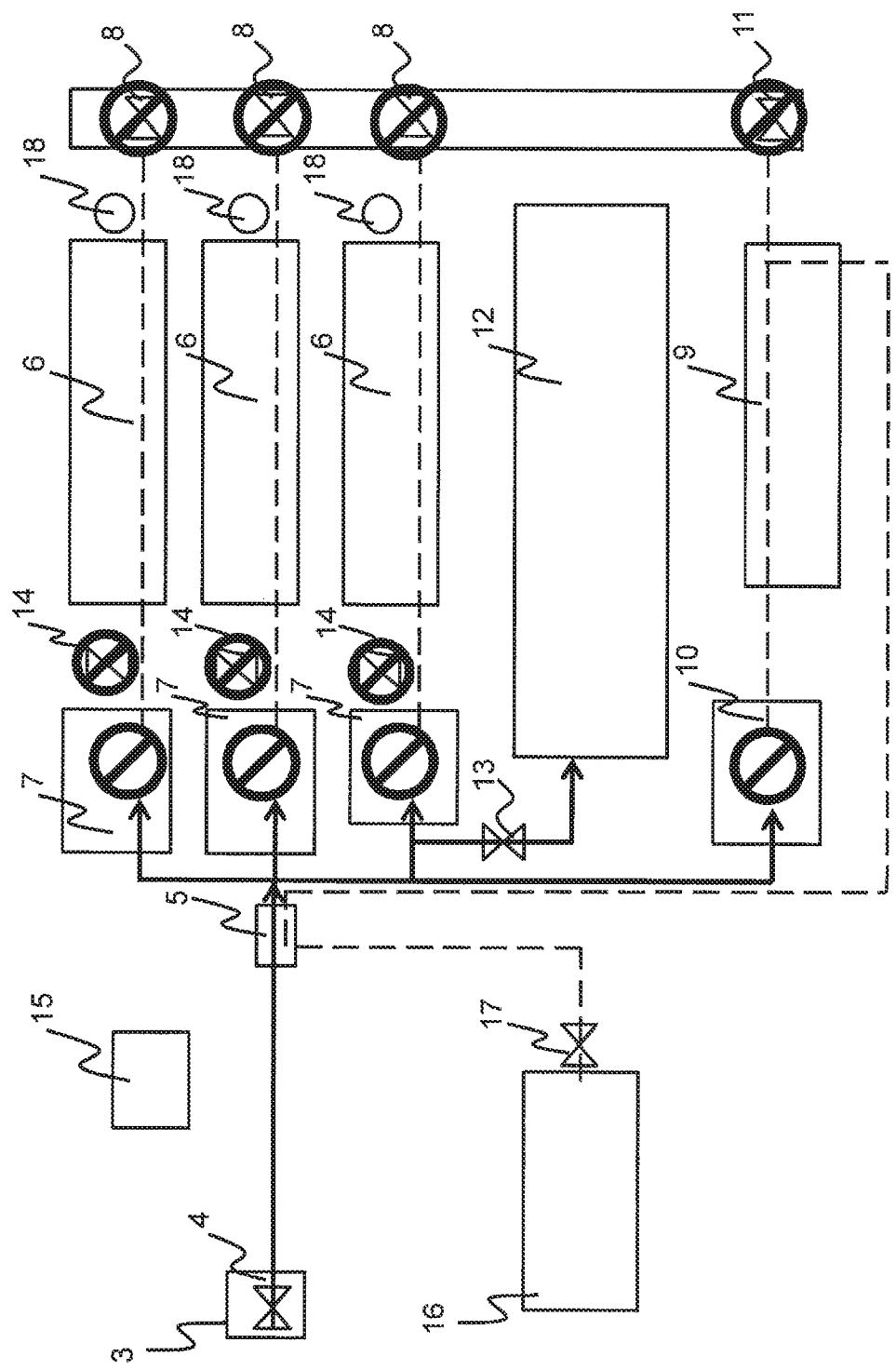
FIGS. 2a to 2d show different arrangements of the elements in the compressed air system for testing different regions of the compressed air system.
Figure 2B:
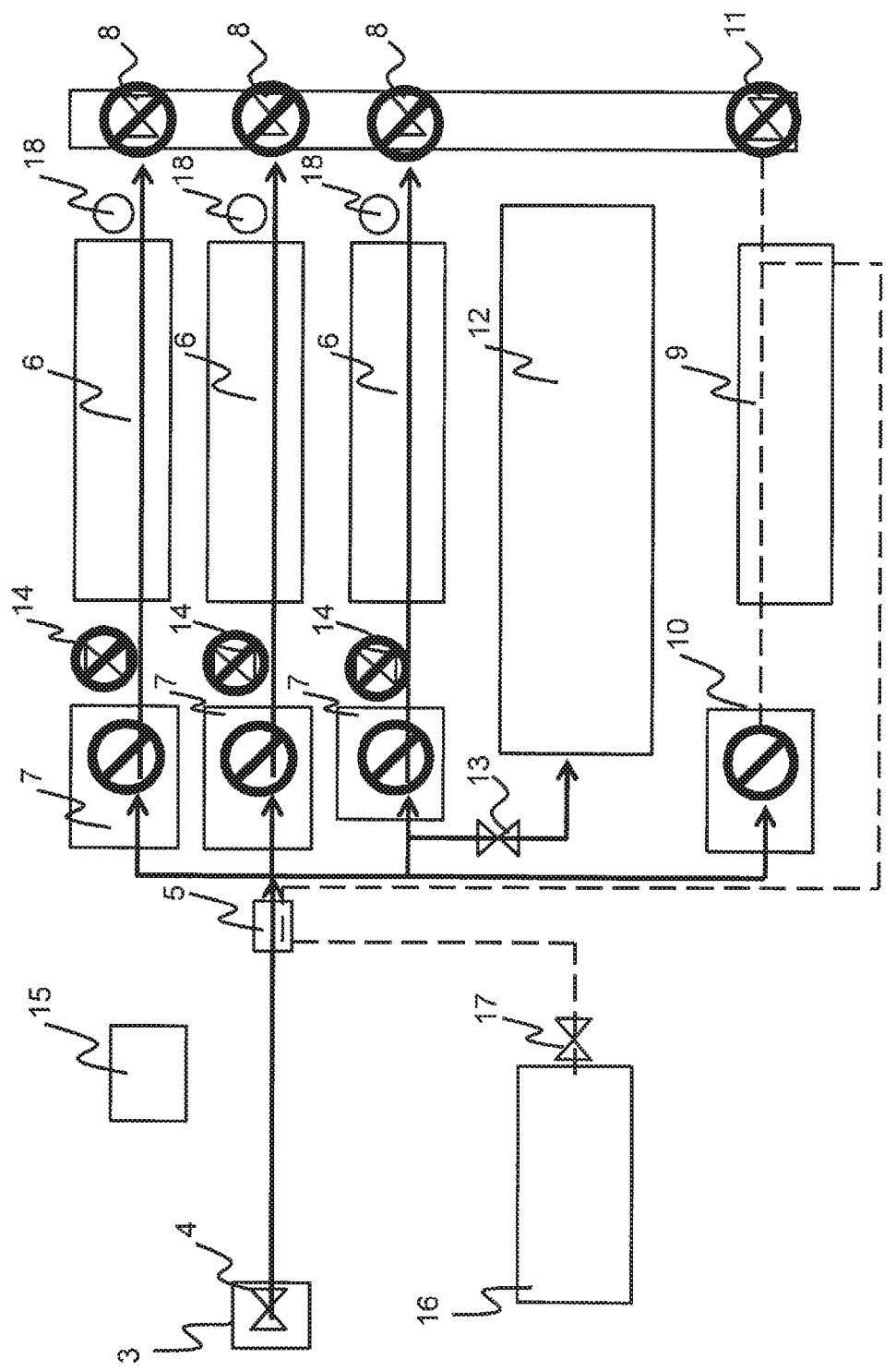

The test for the tightness of the blowing block valves in the blow-molding stations, which can be conducted in particular after the test for the tightness of the dome pressure control valves, comprises that the blowing block valves are closed and the region immediately upstream of the blowing block valves, for example, the ring channels, are pressurized with compressed air, which can be done, for example, by opening the dome pressure control valves. This region is then closed again, for example, the dome pressure control valves are closed. This is shown in FIG. 2b. Then the air pressure in this region is measured, in particular the development of the air pressure over time. If the air pressure in this region remains constant or within a certain tolerance range, then the blowing block valves are considered to be tight. If the air pressure drops to a value outside the tolerance range (provided that the dome pressure control valves are tight), then the blowing block valves are considered to be leaking. It can namely be concluded from the pressure drop that compressed air escapes through the valves in the blow-molding station.

Figure 2C:
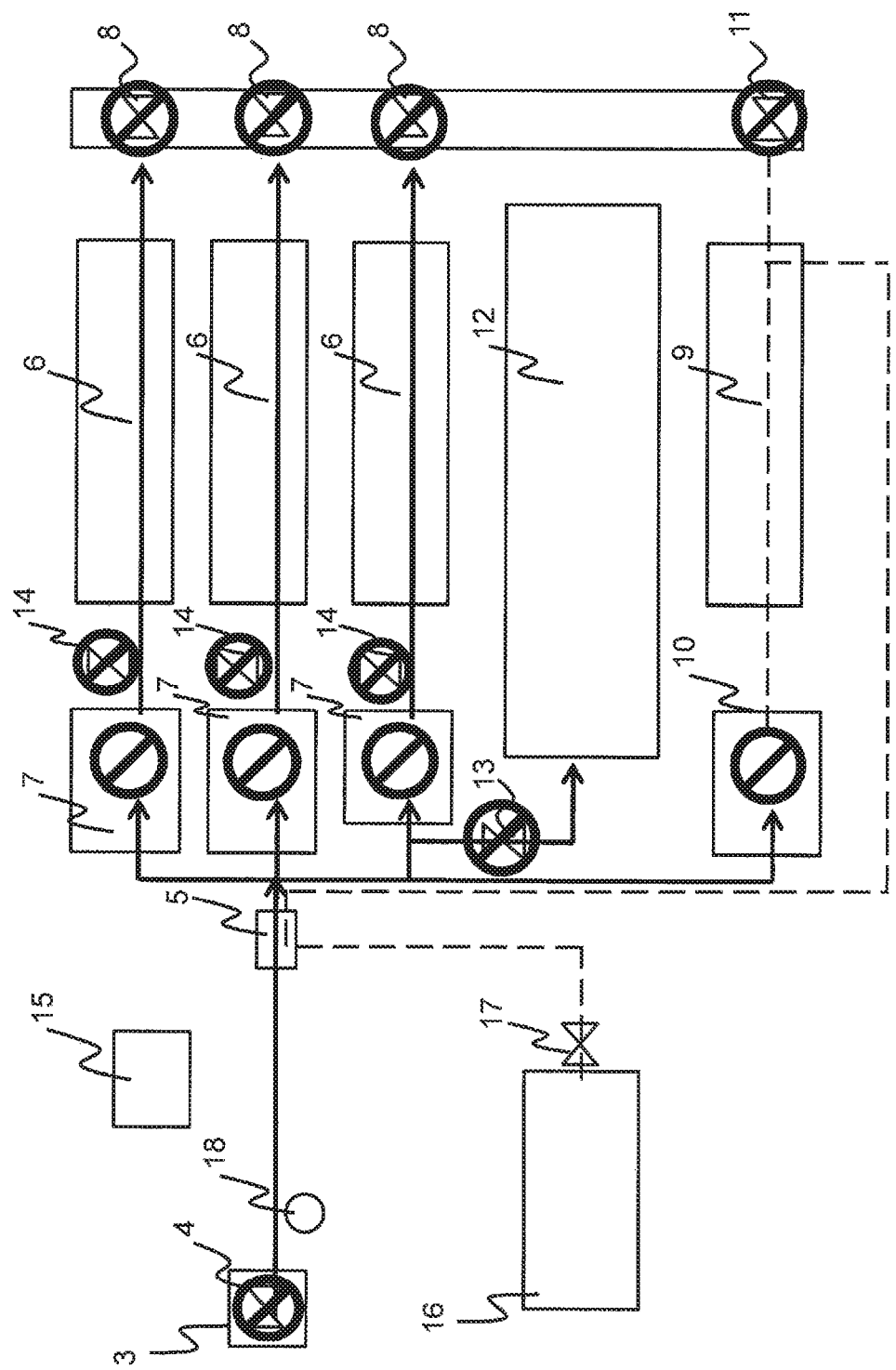

Testing the tightness of a region between the compressed air source and the dome pressure control valves and the low pressure region valve is indicated in FIG. 2c. This can be performed, for example, following the steps described above. For this purpose, all dome pressure control valves remain (or are) closed and, if a low pressure region is present, then the low-pressure valve is also closed and the region is pressurized. The compressed air supply is subsequently interrupted by closing the valve 4 of the compressed air source. A pressure sensor, for example, located between the compressed air source and the rotary distributor or at another location in the region, measures air pressure or the development of the air pressure over time. If the pressure drops to a value that is outside a specified tolerance range, there is a leak present in that region.

Figure 2D:
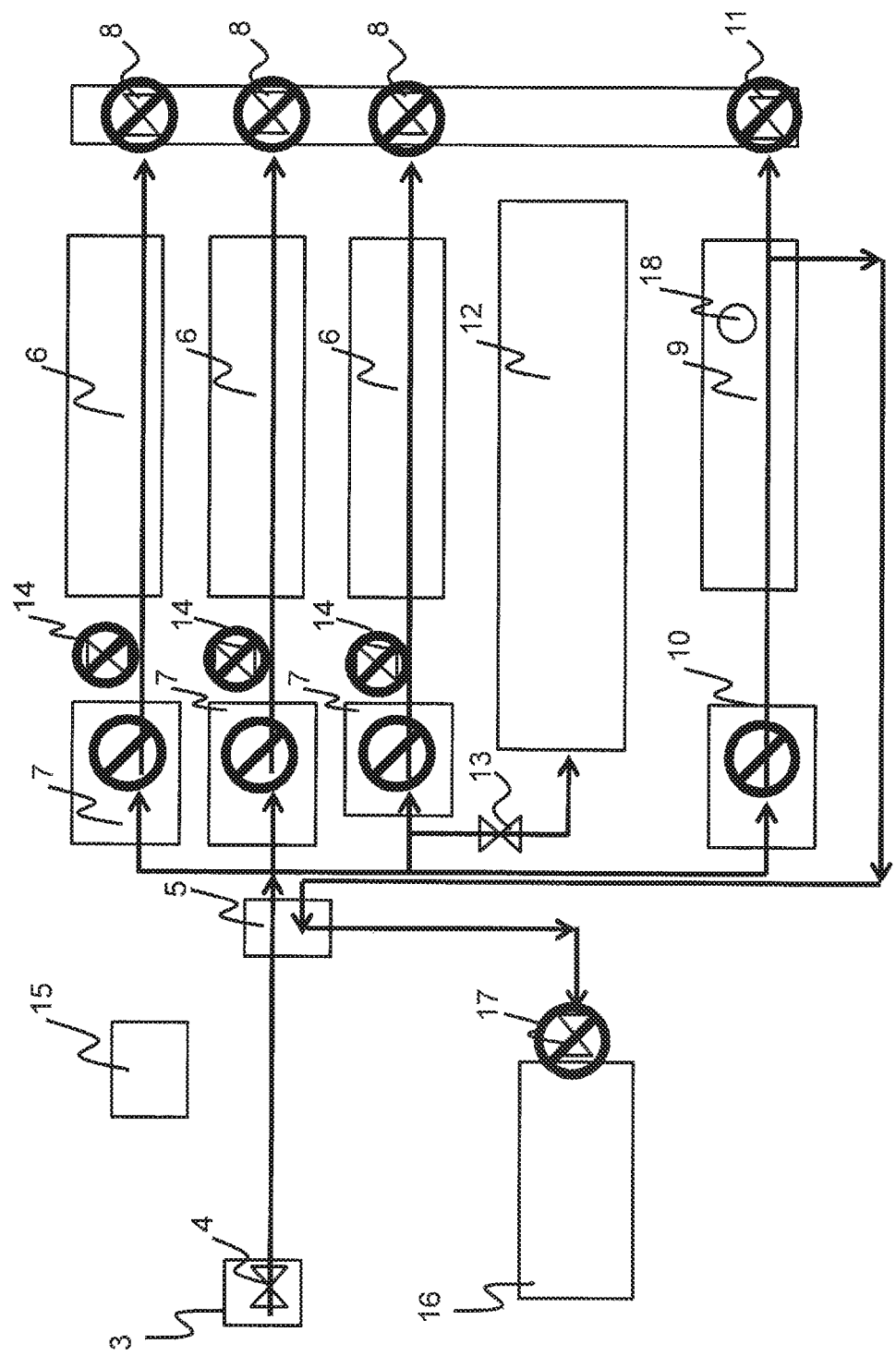

The test of the region between dome pressure control valve 10 and blowing block valve 11 (i.e. in the region of ring channel 9) and between ring channel 9 and consumer valve 17 is shown schematically in FIG. 2d. It can be performed in particular according to the test steps described above. The consumer valve there is closed and dome pressure control valve 10 is initially opened. Then ring channel 9 as well as the region between ring channel 9 and consumer valve 17 is pressurized with compressed air. Dome pressure control valve 10 is subsequently closed again and the air pressure, in particular the development over time, is measured in the region of ring channel 9. If the pressure drops to a value that is outside a specified tolerance range, there is a leak present in that region.

In such a case, it is also conceivable that a feedback to a user is output immediately after each test step, in particular a warning if a leakage is detected, so that a user can decide to interrupt the test run and in particular, replace the dome pressure control valves or the blowing block valves or seal other leaks before continuing the test run, or, if necessary, abort the test run.

The features described above are also applicable to various other devices, in particular various additional or other or differently arranged regions and elements, for example valves, connections or air vessels. The above features are also applicable in particular to any extensions of or attachments to the device.

It is understood that the features mentioned in the embodiments described above are not restricted to these specific combinations and are also possible in any other combination.

The invention claimed is:

1. A method for leakage detection in a blow-molding machine for shaping container preforms comprising a compressed air system which is connected to a compressed air source and comprises at least two fluidically connected regions that are selectively separated from each other or from the environment by a plurality of shut-off elements, wherein the blow-molding machine comprises one or more blow-molding stations, the method comprising:
   conducting a leakage test run, in which at least one of the plurality of shut-off elements or the compressed air supply in said compressed air system is controlled to determine separately for each region whether compressed air escapes therefrom, wherein determining whether compressed air escapes from a region to be tested is done via development of the air pressure over time in the region or in an adjacent region adjoining the region, where conducting the leakage test run comprises:
      pressuring the region to be tested with compressed air;
      separating the region to be tested from other regions and the environment; and
      while the region to be tested is separated, determining the development of the air pressure in the region to be tested or in at least one region adjoining the region to be tested over time by way of measurement values from one or more pressure sensors arranged in either the region to be tested or in the at least one region adjoining the region.

2. The method of claim 1, wherein conducting the leakage test run is performed in an automated manner.

3. The method of claim 1, further comprising determining whether compressed air escapes from the region to be tested when the air pressure in the region drops during a given measuring period below a predetermined limit value or drops at a rate greater than a predetermined limit value, or if the ratio of the pressure loss and a predetermined pressure value, including a target pressure value, or a measured pressure value, wherein the pressure value at a beginning of the given measuring period is greater than a predetermined limit value.

4. The method of claim 1, further comprising:
   determining whether compressed air escapes from the region to be tested to an adjoining region when the air pressure in the adjoining region increases above a predetermined limit value or increases at a rate greater than a predetermined limit value; and
   determining whether compressed air escapes in response to a ratio of the pressure increasing above a predetermined pressure value including a target pressure value, or a measured pressure value, wherein the pressure value at the beginning of the measurement is greater than a predetermined limit value.

5. The method of claim 1, where the development of the air pressure over time in the region to be tested is compared with the development of the air pressure over time in a or in the at least one adjoining region, and it is determined based on the comparison whether a pressure drop in the region to be tested is caused exclusively by compressed air escaping into the adjoining region or exclusively by compressed air escaping into the environment or other adjoining regions or in part by compressed air escaping into the adjoining region and into other adjoining regions or the environment.

6. The method of claim 1, where the leakage test run comprises that it is determined in an automated manner on a basis of test data of a test step of the test run, wherein a control device, which test step is to be executed next, wherein decision rules are stored and applied to test data.

7. A method for leakage detection in a device for shaping container preforms comprising a compressed air system which is connected to a compressed air source and comprises at least two fluidically connected regions that are selectively separated from each other or from the environment by a plurality of shut-off elements, the method comprising:
   conducting a leakage test run, in which at least one of the plurality of shut-off elements or the compressed air supply in said compressed air system is controlled to determine separately for each region whether compressed air escapes therefrom, wherein determining whether compressed air escapes from a region to be tested is done via development of the air pressure over time in the region or in an adjacent region adjoining the region, where conducting the leakage test run comprises:
      pressuring the region to be tested with compressed air;
      separating the region to be tested from other regions and the environment; and
      while the region to be tested is separated, determining the development of the air pressure in the region to be tested or in at least one region adjoining the region to be tested over time, in particular by way of measurement values from one or more pressure sensors arranged in either the region to be tested or in the at least one region adjoining the region;
   determining whether compressed air escapes from the region to be tested to an adjoining region when the air pressure in the adjoining region increases above a predetermined limit value or increases at a rate greater than a predetermined limit value;
   determining whether compressed air escapes in response to a ratio of the pressure increasing above a predetermined pressure value including a target pressure value, or a measured pressure value, wherein the pressure value at the beginning of the measurement is greater than a predetermined limit value; and
   determining whether a shut-off element of the plurality of shut-off elements is leaking between the region to be tested and the adjoining region when compressed air escapes from the region to be tested into the adjoining region.

8. A method for leakage detection in a device for shaping container preforms comprising a compressed air system which is connected to a compressed air source and comprises at least two fluidically connected regions that are selectively separated from each other or from the environment by a plurality of shut-off elements, the method comprising:
   conducting a leakage test run, in which at least one of the plurality of shut-off elements or the compressed air supply in said compressed air system is controlled to determine separately for each region whether compressed air escapes therefrom, wherein the leakage test run for leakage detection comprises a test for a tightness of dome pressure control valves of the plurality of shut-off elements or a test for a tightness of blowing block valves of treatment stations of the device or a test of a compressed air distributor or a test of a low pressure region.

9. The method of claim 8, wherein conducting the leakage test run is performed in an automated manner.

10. The method of claim 8, wherein determining whether compressed air escapes from a region to be tested is done via development of the air pressure over time in the region or in an adjacent region adjoining the region.

11. The method of claim 10, where conducting the leakage test run comprises:
   pressuring the region to be tested with compressed air;
   separating the region to be tested from other regions and the environment; and
   while the region to be tested is separated, determining the development of the air pressure in the region to be tested or in at least one region adjoining the region to be tested over time, by way of measurement values from one or more pressure sensors arranged in either the region to be tested or in the at least one region adjoining the region.

12. The method of claim 11, further comprising determining whether compressed air escapes from the region to be tested when the air pressure in the region drops during a given measuring period below a predetermined limit value or drops at a rate greater than a predetermined limit value, or if the ratio of the pressure loss and a predetermined pressure value, including a target pressure value, or a measured pressure value, wherein the pressure value at a beginning of the given measuring period is greater than a predetermined limit value.

13. The method of claim 11, further comprising:
   determining whether compressed air escapes from the region to be tested to an adjoining region when the air pressure in the adjoining region increases above a predetermined limit value or increases at a rate greater than a predetermined limit value; and
   determining whether compressed air escapes in response to a ratio of the pressure increasing above a predetermined pressure value including a target pressure value, or a measured pressure value, wherein the pressure value at the beginning of the measurement is greater than a predetermined limit value.

14. A blow-molding machine for shaping container preforms comprising a compressed air source and a compressed air system which is connected to the compressed air source and comprises at least two fluidically connected regions that are selectively separated from each other or from the environment by a plurality of shut-off elements, the blow-molding machine comprising one or more blow-molding stations, and the device comprising:
   a control device which is configured to conduct a leakage test run by controlling at least one of the plurality of shut-off elements or the compressed air supply into the compressed air system to determine separately for each region whether compressed air escapes therefrom.

15. The device of claim 14, where the leakage test run is conducted in an automated manner.

16. The device of claim 14, where the control device is adapted to control an opening or a closing of the plurality of shut-off elements or an operation of the compressed air source or an adjustment of valves of the compressed air source or valves between the compressed air source and the compressed air system.

17. The device of claim 14, wherein a pressure sensor is arranged in at least one of the regions for recording an air pressure.

18. The device of claim 17, wherein a data connection is arranged between the pressure sensor and the control device, and wherein the device is configured to allow the control device to receive measured pressure values from the pressure sensor via the data connection.

* * * * *